C. McBURNEY.
SUCTION HOSE.
No. 24,222. Patented May 31, 1859.
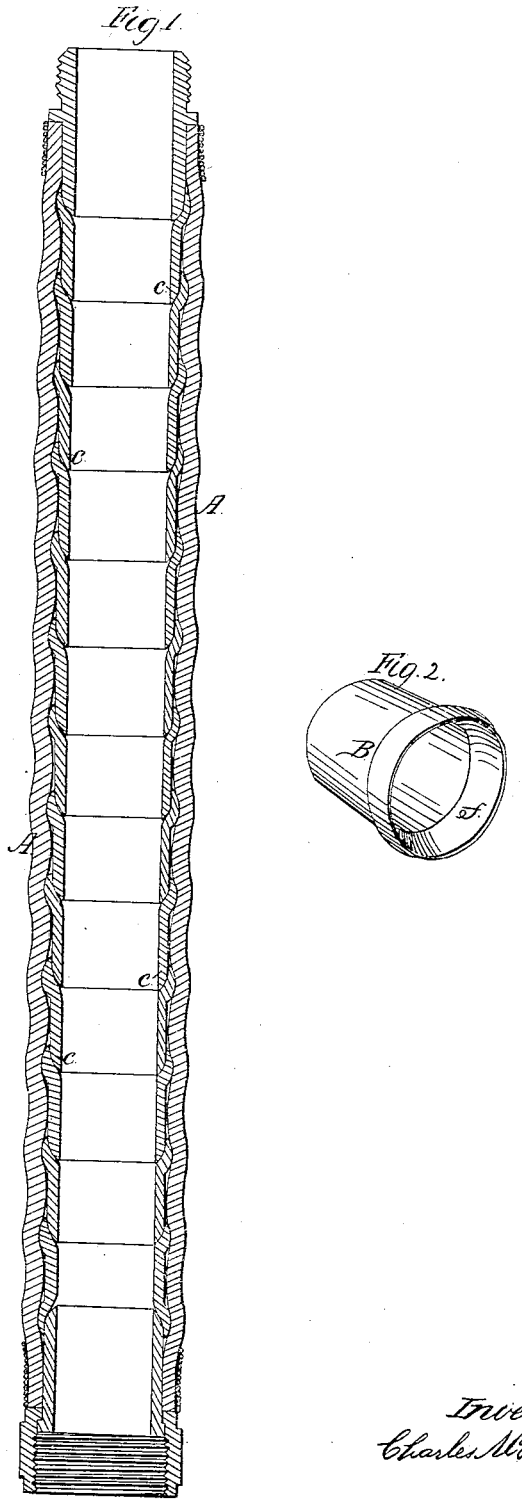

UNITED STATES PATENT OFFICE.

CHARLES McBURNEY, OF ROXBURY, MASSACHUSETTS.

SUCTION-HOSE.

Specification of Letters Patent No. 24,222, dated May 31, 1859.

*To all whom it may concern:*

Be it known that I, CHAS. McBURNEY, of Roxbury, in the county of Norfolk and State of Massachusetts, have invented a new and Improved Suction-Hose, which is also applicable to other uses, and of which the following is a full, clear, and exact description, reference being had to the accompanying drawings, making part of this specification, in which—

Figure 1 is a section through the improved hose. Fig. 2, detached view of one of the rings employed in its manufacture.

Suction hose for fire engines being required to resist an external pressure are made with metallic rings upon their interior placed at a sufficient distance apart to allow the hose to be bent. Such hose is however often required to endure an outward pressure, as when applied to city hydrants and in such cases the rings are frequently misplaced, being partially relieved from the control of the exterior covering of the hose.

To remedy this difficulty is the object of my present invention, which consists in so forming the rings which retain the hose distended, that they shall keep each other in place, each ring having its bore enlarged at one end for the reception of the small end of the adjacent ring as will be presently more fully described.

In the said drawings Figure 1 represents a longitudinal section through the hose, the exterior covering A of which may be made of india rubber or of any other suitable material. The rings B (Fig. 2) are enlarged at one end $f$, the socket so formed being curved as seen in Fig. 1, to receive the rounded end $c$, of the rings and permit them to play laterally with respect to each other and allow the hose to be bent in any direction. It is manifest that rings thus formed and arranged cannot be misplaced should the hose be subjected to a pressure upon its interior surface, and it is my intention to employ it as a conduit for steam wherever an elastic connection is required as it will furnish a metallic passage through its entire length which will not be abraded or worn away by the friction of the rapidly moving steam.

What I claim as my invention and desire to secure by Letters Patent as an improvement in suction hose or steam conduits is—

The rings B, operating in the manner substantially as set forth.

CHAS. McBURNEY.

Witnesses:
P. E. TESCHEMACHER,
SAM. COOPER.